June 26, 1945.  V. A. LARSEN  2,379,164
TWO SPEED TRANSMISSION
Filed May 5, 1943
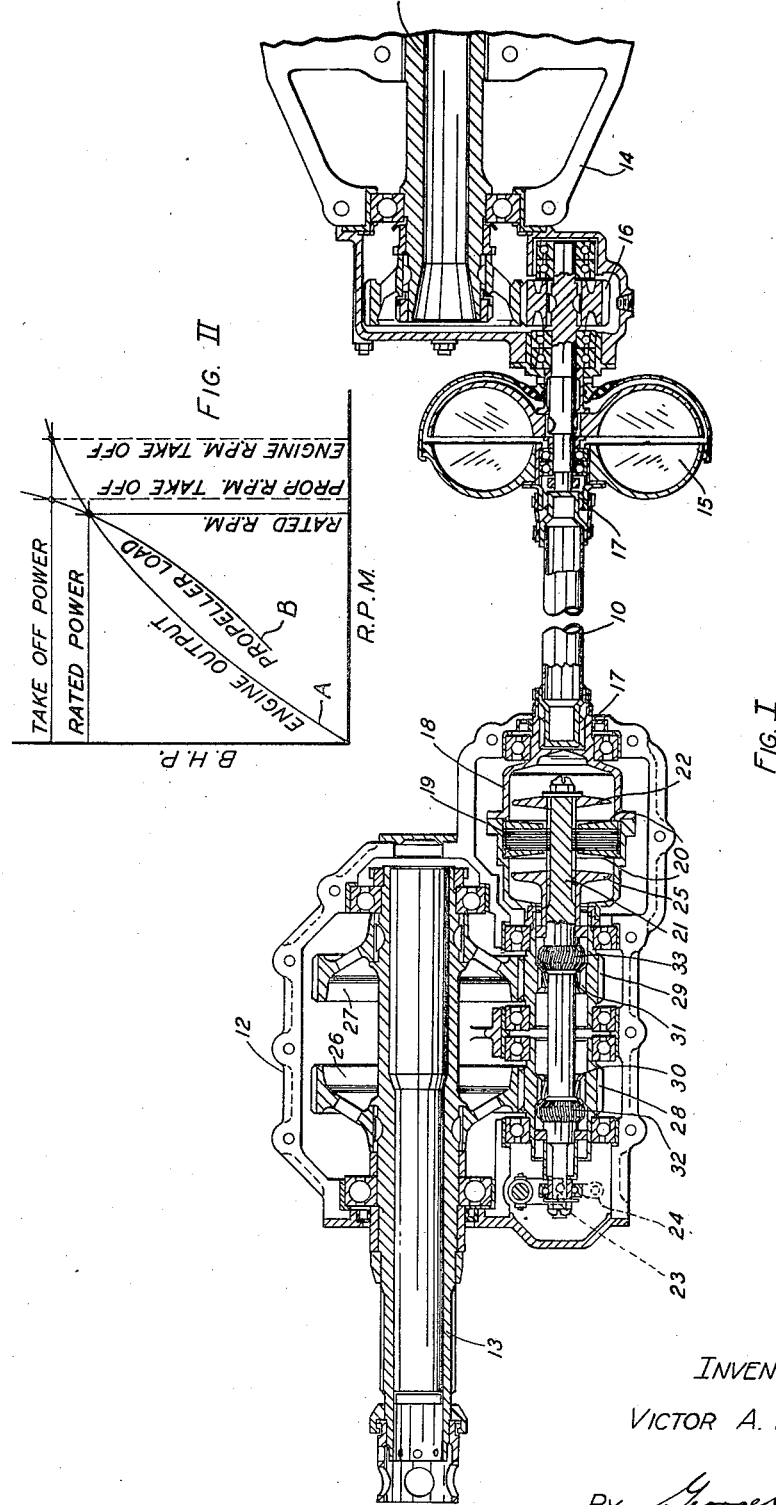
INVENTOR
VICTOR A. LARSEN
BY George C. Sullivan Patented June 26, 1945

2,379,164

UNITED STATES PATENT OFFICE 2,379,164

TWO-SPEED TRANSMISSION

Victor A. Larsen, Altadena, Calif., assignor, by mesne assignments, to Lockheed Aircraft Corporation, a corporation of California Application May 5, 1943, Serial No. 485,957

6 Claims. (Cl. 192—3.5)

This invention relates to an improved two speed transmission for connecting an aircraft propeller to an aircraft engine and has particular reference to an arrangement of gearing to provide optimum propeller performance for both take-off and high speed operation.

It is well known that airplane performance under either take-off or high speed conditions must be sacrificed to obtain optimum performance under the opposite condition. This is because propeller characteristics and engine performance curves have different slopes which intersect rather than coincide, making it necessary to select propellers favoring the desired criteria, or a compromise therebetween. The use of controllable pitch propellers forms a desirable partial solution of the problem, but are heavy and very expensive, practically precluding their use on lighter aircraft using smaller engines, such as trainers, and private aircraft in the medium price range.

Further, my invention leads to improvement in the performance of high powered military aircraft at high altitudes. At high altitude the propeller efficiency falls off because the propeller tip speed approaches the velocity of sound which is lower at higher altitudes than at sea level on account of lower temperatures. It is thus possible to decrease the propeller tip speed by going back into low gear. This, of course, means that the pitch has to be increased. Therefore, a two-speed transmission in conjunction with a controllable pitch propeller is a decided advantage when applied to such aircraft.

It is accordingly an object of this invention to provide a compact, simple and manually selectable two-speed transmission wherein a driving clutch for either speed ratio is held in engagement, after manual initiation thereof, by the torque transmitted therethrough, which torque is not applied until engagement of the selected ratio is completed.

It is a further object of this invention to provide an improved and simplified two speed transmission for propellers wherein two pairs of gears remain in constant mesh and are selectively coupled in driven engagement by helical splines, a neutral position permitting windmilling of the propeller.

It is also an object of this invention to provide a two speed constant mesh gear transmission having an intervening neutral position of the selective mechanism, and wherein torque in one direction serves to maintain the selected drive, while reverse torque acts to disengage the selected drive.

Other and further important objects of this invention will be apparent from the disclosures in the specification and the accompanying drawing.

This invention in its preferred form is illustrated in the drawing and hereinafter more fully described.

In the drawing:

Figure I is a central longitudinal section showing a driving train embodying the features of this invention, a fragmentary portion of an engine crankcase and crankshaft being shown to complete the driving train.

Figure II is a chart illustrating the varying requirements between an aircraft engine and propeller for take-off and rated power operation.

As shown on the drawing:

I have chosen to illustrate my invention as incorporating an extension drive shaft 10 connecting an engine crankshaft 11 to a gear box 12 carrying a propeller shaft 13. The crankcase of the engine is fragmentarily shown at 14, and in order to utilize a small high speed fluid coupling 15 connecting the crankshaft 11 to the drive shaft 10, step up gearing 16 is shown. By, in effect, doubling the speed of the fluid coupling and drive shaft, the size and weight thereof are materially reduced, and such an arrangement also permits the use of a much smaller speed selective clutch unit in the transmission. The drive shaft 10 terminates at each end in splined connections 17 to the fluid coupling and to a clutch housing 18, these connections being so arranged as to provide a universal joint effect to compensate for slight distortions or working in the supporting aircraft structure.

The clutch housing 18 is journaled for rotary motion in the gear box 12 and contains a multiple disc clutch 19 having identical end plates 20 on either side thereof, alternate clutch discs and both the end plates being driven from the housing, each end plate being adapted to abut against a shoulder therein; while the intervening clutch discs drive through splines on a shiftable shaft 21 which carries a pressure plate 22 fixed thereon to engage the clutch when the shaft 21 is axially shifted to the left by a shifting fork 23 and lever 24 manually operated by a suitable control extending from the pilot's position. A collar on the shaft 21, to the left of the clutch discs, serves to engage a second pressure plate 25 with the clutch when the shaft 21 is shifted to the right. When the clutch is engaged from either direction, one pressure plate engages the end plate on its side of the clutch discs to clamp them against the opposite end plate, which is then backed up by its corresponding shoulder in the housing. With this arrangement the clutch can be engaged by shifting the shaft 21 in either direction, and the shaft is allowed sufficient motion from its mid or neutral position, as shown, to engage either of two pairs of reduction gears arranged to selectively drive the extension drive shaft 10, as will now be described.

Two slightly dissimilar pairs of gears 26 and 27 and pinions 28 and 29 are so chosen as to provide the desired differential ratio while having the same center distances, the gears being keyed or splined to the propeller shaft 13 while the pinions are independently journaled in the gear box 12 in axial alignment with the shaft 21, which passes through the hubs of the pinions. Each pinion hub has internal spiral splines 30 and 31 of opposite hand, and the shaft 21 has mating spiral splines 32 and 33 for engagement therewith, the shaft splines being shown as outside the respective hub splines so that when the shaft 21 is shifted to the right the left hand pinion is engaged, and vice versa. When the drive shaft 10 rotates clockwise, as would be the case when the engine and propeller rotate counterclockwise, the left hand pinion splines 30 and the shaft splines 32, are right hand spirals, while the right hand pinion splines are left hand spirals. It will be evident that the shaft splines might equally well be between the two pinion splines instead of outside thereof, in which case the direction of the spirals would be reversed and the direction of shift of the shaft 21 would also be reversed to obtain the same selection of gear ratios.

It is well known that various gear ratios are obtainable with the same shaft center distances. As an example, the right hand pinion and gear combination may be 53 to 20 teeth and the left hand combination 52 to 21 teeth, in which case the driving ratio between the pairs will be as 93.4 is to 100. These step down drive ratios will be designed both to compensate for the step-up drive to the drive shaft, and to produce any desired over all ratios between the propeller shaft 13 and the engine crankshaft 11. The two ratios just mentioned serve to produce two operating ranges, the lower ratio being most suitable for the rated airplane speed wherein the high relative air flow past the airplane and propeller reduces the torque absorbed by the propeller at a given rotational speed, while the higher ratio provides a slower propeller speed with an accompanying higher propeller torque necessary due to the decreased airflow under take-off and climbing conditions of operation.

The chart of Figure II is offered in an effort to explain the design criteria influencing the selection of the gear ratio. In this chart the curve A represents engine power plotted against R. P. M., while the curve B represents propeller performance chosen for best rated power and rated R. P. M. Thus the intersection of curve B with the take-off power point of curve A represents the desired performance, and determines the gear ratio in the transmission. It will be noted that the engine is rated at an increased speed and power for take-off conditions and this is taken into consideration in selecting the two ratios used in the gear box.

While the use of a fluid coupling and extension drive shaft is an advantage in some cases, it is within the scope of my invention to couple the clutch housing 18 directly to the engine crankshaft as in conventional propeller reduction gearing. The fluid coupling is advantageous however as it acts as an engine flywheel and vibration damper. The coupling also facilitates initial engagement of the pinion and shaft splines, as the cushioning effect of the fluid coupling reduces or absorbs the shock of initial engagement as torque is applied to the clutch.

In order to change gear ratios in flight it is evident that the driving torque must be eliminated by throttling the engine to allow the windmilling or overrunning propeller to reverse the torque on the spiral splines which act to hold the clutch engaged. When the torque is thus reversed the splines automatically disengage to move the shaft 21 and its shifter fork 23 to neutral, unless the pilot's operating linkage is provided with a latch, as might be desirable in some circumstances.

If so desired the clutch 19 may be assembled with a minimum clearance between the shoulders backing up the end plates, in order that there may be sufficient drag on the clutch, even when disengaged, to idly rotate the shaft 21 when in its neutral position as shown, as rotation of the shaft 21 would facilitate engagement of the splines thereon with the pinion splines when the latter are rotated by a windmilling propeller. With such as slightly dragging clutch the speed of the shaft 21 can be synchronized with that of the pinion prior to engagement therewith by manipulation of the engine throttle.

It will thus be seen that I have invented an improved two-speed reduction gearing for driving a propeller from an engine wherein the two speed ratios are obtained from constant mesh pairs of gears which are selectively connected to a torque energized driving clutch, and in which driving connections are made and completed prior to the application of torque to said clutch.

Having thus described my invention and the present preferred embodiments thereof, I desire to emphasize the fact that many modifications may be resorted to in a manner limited only by a just interpretation of the following claims.

I claim as my invention:

1. A two speed transmission comprising pairs of driving and driven gears in constant mesh, a common driven shaft operatively associated with said driven gears, said driving gears being disposed in spaced alignment and having spiral splines of opposite hand internally thereof, a gear engaging shaft axially disposed within said driving gears and extending beyond the end thereof, separate spiral splines so disposed on said gear engaging shaft as to be positioned beyond the cooperating spiral splines in said gears, means for shifting said gear engaging shaft to selectively engage either of the spiral splines thereon with its cooperating internal splines in the driving gears, and means for driving said gear engaging shaft when in its shifted gear engaging positions, including a prime mover and a double acting clutch associated between said prime mover and said gear engaging shaft and adapted to be engaged by the axial component of the torque transmitted through the spiral splines engaging the shaft to the gear.

2. A two speed transmission comprising pairs of driving and driven gears in constant mesh, a common driven shaft operatively associated with said driven gears, said driving gears being disposed in spaced alignment and having two sets of spiral splines of opposite hand, a shiftable gear engaging shaft axially disposed within said driving gears and extending beyond the end thereof, two separate sets of spiral splines so disposed on said gear engaging shaft as to be positioned beyond the related sets of spiral splines on said gears, means for shifting said gear engaging shaft to selectively engage either of the sets of spiral splines thereon with its sets of cooperating splines on the driving gears, and means for driving said gear engaging shaft when in its shifted gear engaging positions, including a prime mover, and a double acting clutch associated between the prime mover and said gear engaging shaft and adapted to be engaged by the axial component of the torque transmitted through the spiral splines engaging the shaft to the gear.

3. A two speed transmission comprising pairs of constant mesh driving and driven gears, a common driven shaft on which said driven gears are mounted, said driving gears being separately journaled in spaced alignment, gear clutching elements having a shaft movably disposed internally of said aligned driving gears for selective engagement with either thereof, coacting spiral splines on the last named shaft and within said gears, said splines being of opposite hand in the two driving gears whereby to energize the selected clutching element by the axial component of the driving torque applied to said driving gears, and means for driving said gear clutching elements.

4. A two speed transmission comprising pairs of constant mesh driving and driven gears, a common driven shaft on which said driven gears are secured, said driving gears being separately journaled in spaced alignment, a drive shaft, an axially movable shaft disposed internally of said aligned driving gears, a driving clutch connected between the drive shaft and said axially movable shaft and so constructed and arranged as to be engageable upon shifting said shaft in either direction, and pairs of coacting driving means selectively engageable between either driving gear and the axially movable shaft upon a shift of the latter in one direction or the other.

5. In a two speed transmission, spaced constant mesh pairs of aligned driving and driven gears, a propeller shaft with which said driven gears rotate, a casing in which said shaft is journaled, bearings separately supporting said driving gears in said casing in axial alignment with each other, an axially shiftable clutch shaft passing through said driving gears, engageable means on each driving gear and said clutch shaft for selective driving engagement therebetween engageable upon shifting of the clutch shaft, a drive shaft and a clutch operatively connected between the drive shaft and said axially shiftable clutch shaft and adapted to be engaged by the shifting of said clutch shaft.

6. In a two speed transmission, spaced constant mesh pairs of aligned driving and driven gears, a propeller shaft carrying said driven gears, a casing in which said shaft is journaled, bearings separately supporting said driving gears in said casing in axial alignment with each other, an axially shiftable clutch shaft passing through said driving gears, pairs of engageable means on the driving gears and said clutch shaft for selective driving engagement therebetween, one pair of said means being engaged upon movement of the clutch shaft in one direction, the other pair of said means being engaged upon movement of the clutch shaft in the other direction, said means having an axial thrust component when transmitting torque, a drive shaft, and a clutch connected between the drive shaft and said clutch shaft and adapted to be engaged by the shifting of said clutch shaft and held engaged by said axial thrust component, and means for driving said clutch.

VICTOR A. LARSEN.